United States Patent [19]
Johnson

[11] 3,738,046
[45] June 12, 1973

[54] ADVANCING FISH LURE

[76] Inventor: Nels A. Johnson, 300 Shady Lane, Palatine, Ill.

[22] Filed: June 16, 1971

[21] Appl. No.: 153,593

[52] U.S. Cl............... 43/42.39, 43/42.47, 43/43.13
[51] Int. Cl...................... A01k 85/04, A01k 95/00
[58] Field of Search..................... 43/42.39, 42.37, 43/42.47, 43.13

[56] References Cited
UNITED STATES PATENTS

| | | | |
|---|---|---|---|
| 3,568,355 | 3/1971 | Hassell | 43/43.13 |
| 780,029 | 1/1905 | Flegle | 43/43.13 |
| 1,653,400 | 12/1927 | Jeffries | 43/42.39 |
| 2,235,868 | 3/1941 | Coolidge et al | 43/43.13 |
| 3,401,483 | 9/1968 | Bellah et al | 43/42.39 |
| 2,557,599 | 6/1951 | Dunmire | 43/42.39 X |
| 3,570,167 | 3/1971 | Smith | 43/43.13 X |
| 2,741,863 | 4/1956 | Magill | 43/43.13 |

Primary Examiner—Louis G. Mancene
Assistant Examiner—James H. Czerwonky
Attorney—Richard J. Myers

[57] ABSTRACT

A fish lure having a free water floating fall glide forward in a more toward horizontal angle to the water surface and having a pulled anti-gravity rise rearward in a more steep inclination to the water surface. The lure includes a downwardly tapered longitudinally weighted V-shaped hull body having a fish hook mounted thereon and extending from the lower forward body nose end. The body also has a fish line anchor extending from the lower rearward body tail end and an overhead flat stabilizer wing mounted on top of the body rearward of the nose end. The stabilizer wing extends in overhanging relation beyond the tail end and over the line anchor and terminating rearwardly in an upturned wing portion for retarding descent of the lure in free fall glide.

7 Claims, 10 Drawing Figures

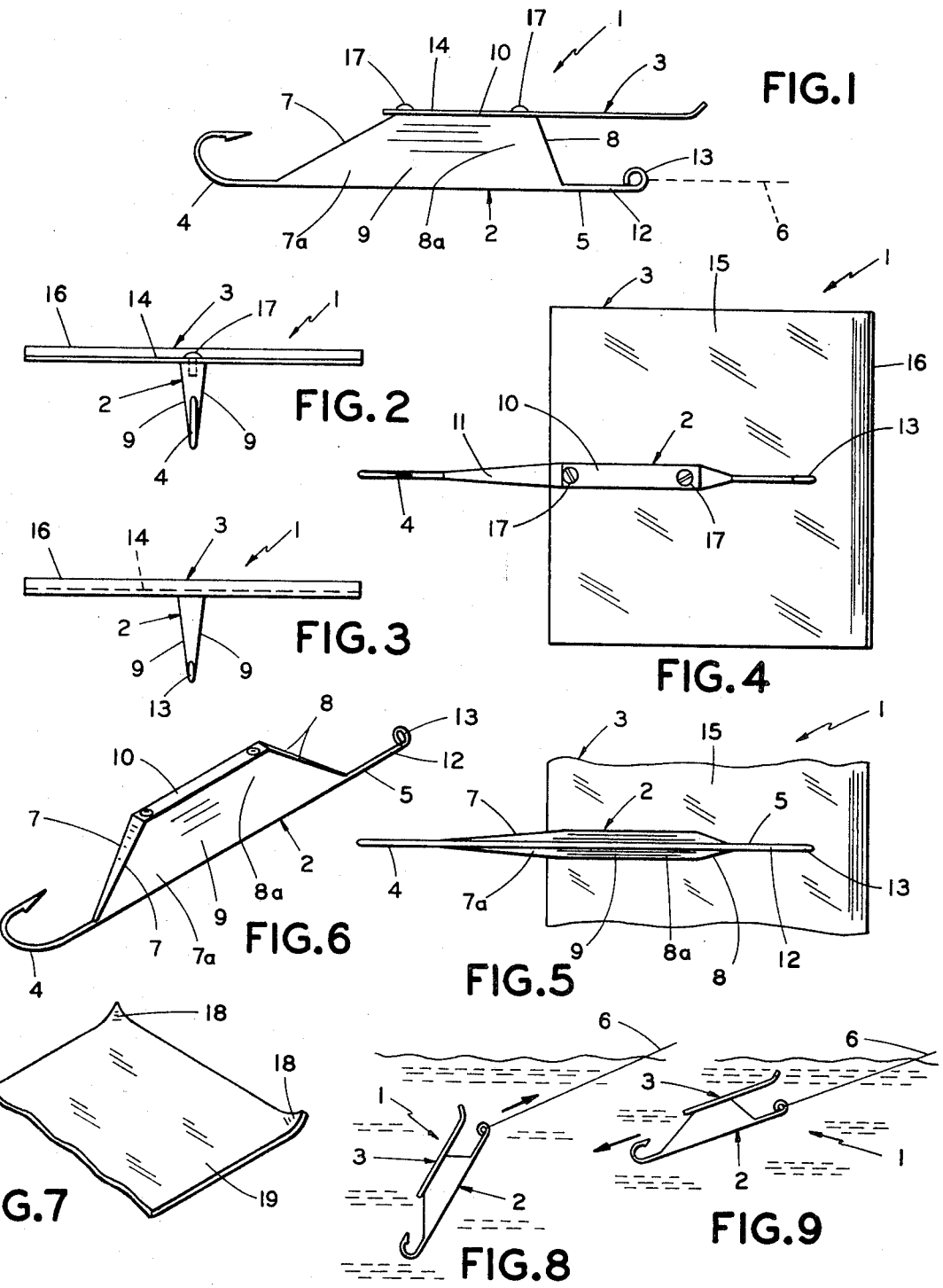

ADVANCING FISH LURE

BACKGROUND OF THE INVENTION

1. Field of the Invention

This invention relates to the art of casting for fish and in particular relates to a fish line advancing lure which is capable of traveling away from the angler.

2. Description of the Prior Art

It is known in the prior art to provide for a device to advance a line through water by the force of gravity as, for instance, shown by U.S. Pat. No. 2,520,562 and it is further known to use a fish lure that is propelled forward due to the buoyancy of the lure as shown by U.S. Pat. No. 3,401,483. However, for fishing substantially below with a sinking lure it is preferred that the lure not bob up toward the surface but rather head deeper as the lure moves away from the fisherman

SUMMARY

This invention relates to fishing lures and in particular to the type of fishing lures that scan the fishing area in directional travel while the fisherman remains relatively fixed. The invention has for its object fishing lure that is carried a predetermined distance forward in a flight path by a wing designed and in gradual downward descent from the fisherman due to gravity and in a reverse retrieval path less than the predetermined distance and in a steep upwardly inclined rise toward the fisherman due to pull on the fishing line. The invention further contemplates an elongated weight fixed underneath a light-weight wing. Further, for desirable float and retrieval travel distance the rear of the wing extends above and beyond the line anchor location. Also, an upturned rear edge on the wing provides desirable horizontal glide and rear lofting pull characteristics.

BRIEF DESCRIPTION OF THE DRAWING

FIG. 1 is a side elevational view of the lure;
FIG. 2 is a rear elevational view of the lure;
FIG. 3 is a front elevational view of the lure;
FIG. 4 is a top plan view of the lure;
FIG. 5 is a bottom plan view of the lure;
FIG. 6 is a perspective view of the lure weighted body;
FIG. 7 is a modified form of the fish lure wing design;
FIG. 8 shows the position of the lure upon rearward pull by the fisherman;
FIG. 9 shows the forward glide position of the lure; and
FIG. 10 shows the path of travel of the lure.

DESCRIPTION OF THE PREFERRED EMBODIMENTS

With reference now to the drawings and in particular with reference to FIGS. 1-6, there is shown a fishing lure 1 having a fish lure body 2 and a stabilizer wing member 3. The body 2, at its forward lower end, is provided with an upwardly and backwardly curving hook 4 for catching a fish and is provided at its rearward lower end with a fish line anchor member 5 which has secured thereto a fishing line 6 which is connected with a rod and reel held by a fisherman standing on the shore while the lure and line are in the water.

The lure body 2 has a forward portion 7a that has a less steep forward downward sloping upper edge portion 7 (see FIG. 1). The body 2 has a rearward body portion 8a that has a steeper rearward downward sloping upper edge portion 8 (see FIG. 1). In top plan view (see FIG. 4), the forward portion 7a which has a flat upper part or top 11 is tapered forwardly to where the hook 4 is fixedly attached and extending forwardly therefrom and the rearward portion 8a has generally an elongated and rectangular flat top 10, the anchor 5 being fixedly attached thereto and extending rearwardly therefrom. The body portions 7a and 8a are similarly shaped in bottom plan view (see FIG. 5). In forward and rear transverse or end views (see FIGS. 2 and 3) it is seen that both forward and rearward body portions 7a and 8a have downwardly tapered or V-shaped hull side portion 9 and flat top portions. The body 2 is a weight that causes the lure to sink when going in a forward movement away from the fisherman. The V-shaped hull of the body allows the lure to cut or knife through the water in fish-like fashion. The knifing action of the body is aided by the sloped edge 7 of its head or nose portion 7a (see FIG. 1) and by the horizontal tapering of the nose or forward portion 7a (see FIGS. 4 and 5). The nose portion 7a may be one color and the tail or rear portion another and be an aid to attract the fish. Since the rear portion 8a has a less tapered end than the forward end 7a, the tendency of the lure is to have its forward end face forward when going in a forward direction, there being less resistance offered at the forward tapered end and thus the hook is ahead of the anchor in forward travel and the hook is free of the line and ready to be caught by a fish. The anchor 5 is provided with a stem 12 and a line eye 13.

The stabilizer wing member 3 is of a clear or transparent rigid plastic horizontal plate or flat member 14 which is light that gives stable flight to the lure and the fish cannot see the wing and this makes the lure look more like another fish. The plate member 14 has each of its side portions extending laterally out from the body 2 and is mounted on top of the body 2 by screws or fastening means 17. The plate 14 has a forward wing body portion 15 that is generally rectangular and extends from the front top edge of the rear or tail portion 8a past upper rear edge of the tapered edge 8 and above and beyond the eye 13. The plate has a rear upturned end flange or wing rear edge portion 16. The rear end wing portion 16 extends the full transverse or lateral extent of the wing plate member 14 and is at an upward acute angle of approximately 45° to the horizon or surface of the water; whereas the modified wing plate 19 of FIG. 7 has only upturned wing lateral end tip portions 18 which may also be at a 45° angle to the horizontal or the top back of the lure. The upturned edge 16 or end tips 18 aid to cause the rear end of the lure to raise up relative to the forward end of the lure when the lure is pulled rearward and aid to slow down the descent of the rear end of the lure relative to the forward end in forward travel. The large flat underside portions of the wing member 14 stabilize the lure in forward glide to maintain the body in the upright position shown in FIG. 1 but a slight forward downward tilt (see FIG. 10) occurs because the nose portion 7a extends forwardly beyond the wing 3.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A fish lure having in water a free fall glide forward in a more toward horizontal angle to the water surface and having a pulled anti-gravity rise rearward in a more steep inclination to the water surface and including:
   a longitudinally extending weighted non-water-buoyant, substantially V-shaped hull body having a fish hook mounted on and extending from one end portion of the body and having a fish line anchor extending from the other end portion,
   said one end portion comprising a forwardly extending nose section having a front lower portion with the hook mounted on and extending forwardly from the front lower portion and said other end portion comprising a tail section having a rear lower portion with the anchor extending rearwardly from the rear lower portion,
   an overhead, substantially plate-like stabilizer member being mounted on top of the body substantially rearwardly from said nose section and extending outwardly of said other end portion and spaced upwardly from the anchor,
   the weight of the lure being substantially concentrated in the body whereby the body acts as a fish line sinker and the stabilizer acts as a gliding and stabilizing element in fluid, dynamically guiding the line in forward inclined descent in the water,
   said stabilizer member being a generally flat and generally horizontally extending element extending laterally outwardly on each side of said body and rearwardly and laterally outwardly of said body and the nose section extending below and forwardly outwardly of the stabilizer,
   said stabilizer member having an upturned end portion rearwardly extending beyond the body and above the anchor.

2. The invention according to claim 1, and
   said one body end potion comprising said forward nose section having sides that taper longitudinally forwardly toward the end thereof.

3. The invention according to claim 1, and
   said body having sides tapering downwardly in a generally V-shaped configuration.

4. The invention according to claim 1, and
   said one end portion having a forwardly downwardly sloping top surface.

5. The invention according to claim 1, and
   said other end section having an upper rear end surface sloping rearwardly downward.

6. The invention according to claim 1, and
   said nose section having an upper surface sloping down to the hook and said tail section having an upper surface sloping downward toward said anchor.

7. The invention acording to claim 1, and
   said stabilizer member having said upturned end portion upturned at its rearward end to form laterally spaced apart upturned lateral tips.

* * * * *